United States Patent [19]

Awalt, Jr.

[11] Patent Number: 4,750,445

[45] Date of Patent: Jun. 14, 1988

[54] ANCHOR, SHANK, SHACKLE, CHAIN LOCK ASSEMBLY

[75] Inventor: Thomas Y. Awalt, Jr., Pensacola, Fla.

[73] Assignee: Deep Seven Co., Pensacola, Fla.

[21] Appl. No.: 914,983

[22] Filed: Oct. 3, 1986

[51] Int. Cl.[4] ............................................. B63B 21/18
[52] U.S. Cl. ................................................. 114/200; 59/93
[58] Field of Search .............. 114/200, 199, 210, 230, 114/293, 294, 218, 179, 180; 59/93, 78, 78.1, 79.3; 24/116 R; 256/389, 407

[56] References Cited

U.S. PATENT DOCUMENTS

| | | | |
|---|---|---|---|
| 2,878,640 | 3/1959 | Johnson | 59/93 |
| 3,675,608 | 7/1972 | Webb | 114/210 |
| 3,777,477 | 12/1973 | Biondo | 59/93 |
| 3,991,699 | 11/1976 | Bass | 114/210 |
| 4,242,977 | 1/1981 | Long | 114/210 |

Primary Examiner—Sherman D. Basinger
Assistant Examiner—Jesús D. Sotelo

[57] ABSTRACT

The invention is a channel-shaped quick release anchor and chain locking device comprising a channel with shouldered sides and a quick-release pin.

4 Claims, 1 Drawing Sheet

ANCHOR, SHANK, SHACKLE, CHAIN LOCK ASSEMBLY

BACKGROUND OF THE INVENTION

A. Field of the Invention

The invention relates to anchors, shackles, chain, and more particularly to an invention for securing an anchor on the bow of a boat when the head of the shank of the anchor is resting on a roller, pin, channel or other apparatus and the flukes, plow or other digging portions are overlapping the roller, pin or channel.

B. The Prior Art

Most intermediate size boats in the 25–65 foot range have some accommodation for one or more anchors at the ready on the bow. An "anchor at the ready" as used herein is an anchor which can be released from the bow through a chute, over a roller or with other state of the art apparatus.

Attached to most of these anchors is one or more shackles and a length of chain. While there are some elaborate systems for holding the anchor in place with winch gypsies, windless gypsies and/or chain pawl locks, most of these devices cannot be relied upon to prevent accidental release. Many less sophisticated systems require that the anchor be lashed with line or hooked with elastic (Bungie) cord on the bow to prevent accidental release.

Lashings or elastic retainers are imperfect and susceptible to accidental release; and they are sometimes slow to make fast and to release.

Moreover, different types of anchors are connected to anchor rodes in a variety of ways, so that a securing means for one system may not work for another.

An object of the invention is to provide a safe means for securing the anchor in place on the bow of a boat quickly and to release the anchor quickly.

Another object is to provide a securing means and method which is readily adaptable to various anchors and connecting means.

Briefly, the objects of this invention are accomplished in a lock comprising a channel and a quick-release pin. The channel is shaped so that the pin passes through the channel near the apex of a shoulder sloping downward at about 30°–55° from the horizontal, so that it will not snag a shackle or thimble, so that an anchor having a large eye can be pinned through the eye; so that the eye end of an anchor shank which has a small eye will rest on or in the channel with the pin through the second shackle; and so that a chain can be pin locked in the channel, in all cases without snagging shackles, thimbles or chain which may be passed over the channel to release or retrieve the anchor.

In the detailed description, reference will be made to the attached drawing in which.

DETAILED DESCRIPTION OF THE PREFERRED EMBODIMENT

Figure 1:
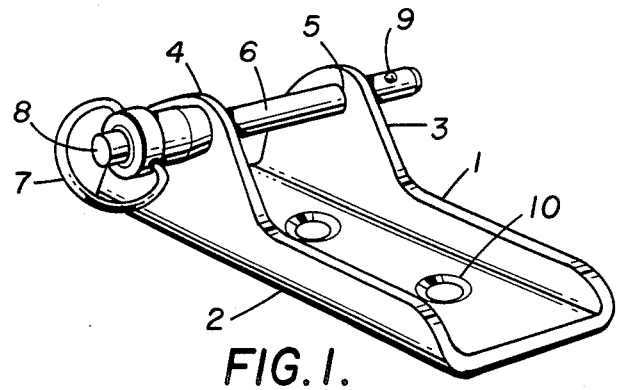
FIG. 1 is a perspective of a preferred embodiment of this invention

Referring now to FIG. 1, channel member 1 comprises a base 2 and sides 3. Sides 3 which are essentially coplanar have shoulder-like configurations with high portions culminating in apex 4. Near apex 4 are quick release pin orifices 5 through which quick release pin 6 may be inserted. Base mounting orifices 10 permit fastening to the deck, a mounting block or similar horizontal surface. Quick release pin 6 comprises quick release pin pull ring 7 quick release button 8 and locking ball 9 (shown in FIG. 4).

Figure 2:
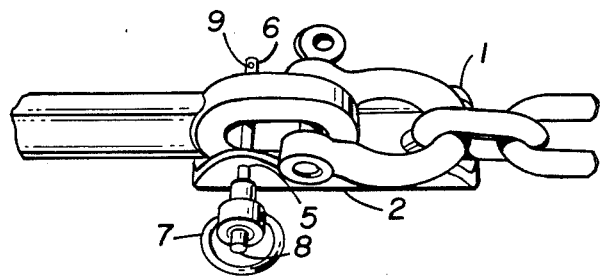
FIG. 2 is a perspective of the same preferred embodiment showing an anchor pin locked therein through the shank eye

FIG. 2 shows the same preferred embodiment with the pin locking the shank of an anchor.

Figure 3:
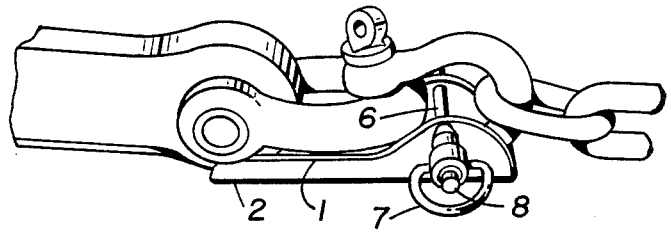
FIG. 3 is a perspective of the same preferred embodiment showing an anchor pin locked therein with the pin passing through the second shackle.

FIG. 3 shows the same preferred embodiment with the pin locking the second shackle in an anchor-rode attachment assembly.

Figure 4:
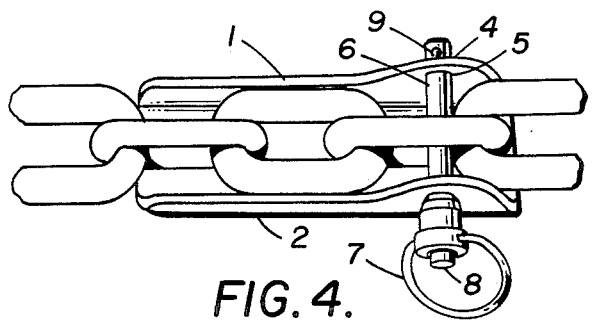
FIG. 4 is a perspective of the same preferred embodiment showing the use of the same preferred embodiment to pin lock a chain.

FIG. 4 shows the same preferred embodiment locking chain.

As shown in FIG. 1, orifices 5 are near the apex of the shoulder-like configurations of the sides of the channel. This permits the shackles shown in FIGS. 2 and 3 to come to rest in a position where the pin can be inserted to lock the anchor. As indicated above the slopes of the shoulders being about 35°–55° from the horizontal permits passage of the relatively large shackles and thimbles ordinarily used in state of the art anchor assemblies, to pass over the channel in either direction without snagging.

The quick release pin preferred for use with the preferred embodiment is the spring-loaded ball lock variety commercially sold under the name AVIBANK Ball-Lok TM marine pin.

The device shown in FIG. 1 also permits the use of a conventional padlock as substitute for the quick release pin whenever desired.

As shown in FIG. 1, the preferred embodiment includes, as part of sides 3, a relatively low side continuation. The purpose of this low side continuation is to better contain the end of the anchor shank when in the locked positions shown in FIGS. 2 and 3.

In operation, the anchor shank, shackle or chain is released by pushing quick release button 8 and removing quick release pin pull ring 7. Enlarged elements of the anchor shackling assembly such as the shackles and thimbles will ride over apex 4 without snagging.

Conversely, the anchor can be retrieved without snagging and is secured by inserting quick release pin 6 through the anchor shank, shackle or chain.

I claim:

1. A channel member for a quick release shank eye, shackle and chain lock comprising:
   (a) an elongated channel having an essentially planar base and two essentially planar sides providing two directions of travel for an anchor rode through the channel
   (b) each of said sides having, in congruent and parallel planar relationship with the other side, a shoulder-like high portion with an apex and edges sloping downwardly therefrom at an angle of about 35°–55° from the essentially planar base and with no portion of the edges being essentially perpendicular to the essentially planar base, thereby providing an uplifting non-snagging shouldering effect in both directions of travel through the channel to chain links, large shackles and thimbles and other outsize elements of the anchor rode (c) each of said shoulder-like high portions having at least one circular orifice, the orifice being near the apex and defined by rotation of a radius on an axis, the axis of rotation of each orifice being essentially the same, and (d) mounting means for the channel.

2. The channel member of claim 1 further including continuation of the sides throughout the length of the channel member at a level substantially lower than the shoulders.

3. The channel member of claim 1 further including a quick release pin of a suitable diameter and length to fit through each of said orifices 4. As a new use for a quick release pin and the channel member of claim 1 the locking and unlocking of an anchor on a rode at the bow roller by mounting the channel member in or near the path of the rode, so that the rode runs through the channel member, placing the quick release pin through a link, shackle or the shank of the anchor and through the orifices of the channel, thereby to lock the anchor; and withdrawing the pin thereby to unlock the anchor.

* * * * *